(12) United States Patent
Iwai et al.

(10) Patent No.: US 8,901,808 B2
(45) Date of Patent: Dec. 2, 2014

(54) ULTRAVIOLET LIGHT-EMITTING MATERIAL AND ULTRAVIOLET LIGHT SOURCE

(71) Applicant: Futaba Corporation, Mobara-shi, Chiba (JP)

(72) Inventors: Yuki Iwai, Mobara (JP); Kazuhito Nakamura, Mobara (JP); Yoshitaka Sato, Mobara (JP); Kiyoyuki Deguchi, Mobara (JP)

(73) Assignee: Futaba Corporation, Mobara-Shi, Chiba (JP)

( * ) Notice: Subject to any disclaimer, the term of this patent is extended or adjusted under 35 U.S.C. 154(b) by 0 days.

(21) Appl. No.: 13/894,186

(22) Filed: May 14, 2013

(65) Prior Publication Data

US 2013/0313964 A1  Nov. 28, 2013

(30) Foreign Application Priority Data

May 25, 2012  (JP) .................. 2012-119839

(51) Int. Cl.
*H01J 1/62* (2006.01)
*H01J 63/04* (2006.01)
*C09K 11/77* (2006.01)
*H01J 63/06* (2006.01)
*H01J 1/63* (2006.01)

(52) U.S. Cl.
CPC ............. *C09K 11/7706* (2013.01); *H01J 63/06* (2013.01); *H01J 1/63* (2013.01)
USPC .................... 313/497; 252/301.4 R

(58) Field of Classification Search
CPC ....... H01J 31/124; H01J 31/127; H01J 31/15; H01J 2329/00; H01J 1/63; H01J 63/06; C09K 11/7774; C09K 11/7706
USPC ................. 313/422, 495–497, 483, 485, 486; 252/301.4 R
See application file for complete search history.

(56) References Cited

U.S. PATENT DOCUMENTS

2010/0289435 A1* 11/2010 Kita ............................ 315/363
2012/0161609 A1*  6/2012 Ono et al. .................... 313/497

FOREIGN PATENT DOCUMENTS

JP      2007-009095 A     1/2007
WO     WO 2011027881 A1 *  3/2011
WO     WO 2011119598 A2 *  9/2011  .............. C04B 35/66

OTHER PUBLICATIONS

Li et al., Ultraviolet emission and Fano resonance in doped nano-alumina, Mar. 15, 2007, Journal of Applied Physics, 101,053534.*
Lima et al., An ab-initio study of electronic and optical properties of corundum Al2O3 doped with Sc,Y, Zr, and Nb, Nov. 5, 2012, Journal of Applied Physics 112, 093709.*
Benam et al., Effect of substituted IIIB transition metals on the energy gap of alpha-AL2O3 by first-principle calculations, 2006, PHysica Status Solidi A: Applications and Materials Science, 203(9). Abstract only.*

* cited by examiner

*Primary Examiner* — Mariceli Santiago
*Assistant Examiner* — Glenn Zimmerman
(74) *Attorney, Agent, or Firm* — Quarles & Brady LLP

(57) ABSTRACT

The invention provides a new ultraviolet light-emitting material and ultraviolet light source in which bacteriocidal performance, operating life, and luminescence efficiency are enhanced without any risk of adversely affecting human bodies. An ultraviolet light-emitting material has a composition as represented by Formula (A):

$$(Al_{1-x}Sc_x)_2O_3 \qquad (A)$$

where a dopant, Sc is added to a matrix, $Al_2O_3$, and x satisfies $0 < x < 1$.

4 Claims, 7 Drawing Sheets

(a)

(b)

(a)

The direction of the cathode extending in a tensioned state (b)

| Material | Luminescence intensity [mW/cm²] | Peak wavelength [nm] | Bacteriocidal efficacy | Bacteriocidal capability (intensity × efficacy) | Relative bacteriocidal capability value |
|---|---|---|---|---|---|
| hBN | 0.38 | 221 | 0.36 | 0.14 | 1 |
| (Al$_{1-x}$Sc$_x$)$_2$O$_3$ | 5.7 | 233 | 0.54 | 3.1 | 23 |

-Anode driven at 5kV-0.15mA
-Light-emitting surface area:1cm²
-Photodiode sensitivity:190-1100nm

Fig.6

| Material | Luminescence intensity [mW/cm²] | Peak wavelength [nm] | Bacteriocidal efficacy | Bacteriocidal capability (intensity × efficacy) |
|---|---|---|---|---|
| hBN | 0.9 | 223 | 0.36 | 0.3 |
| Hg lamp | 10.0 | 254 | 0.78 | 7.8 |

ULTRAVIOLET LIGHT-EMITTING MATERIAL AND ULTRAVIOLET LIGHT SOURCE

CROSS-REFERENCE TO RELATED APPLICATIONS

This application claims priority from Japanese Patent Application No. 2012-119839 filed on May 25, 2012.

BACKGROUND OF THE INVENTION

1. Field of the Invention

The invention relates to an ultraviolet light-emitting material, which emits ultraviolet light, in particular UV-C having a wavelength of less than 280 nm, and an ultraviolet light source manufactured by using the same ultraviolet light-emitting material.

2. Background of the Invention

Once ultraviolet is absorbed into bacterial cell, a nuclear protein configuration of the cell is chemically modified and then the vitality and metabolism of the bacteria is adversely affected. As a result, the proliferative ability of the bacteria is lost, and plasma breakage occurs, thereby causing bacterial death. Such ability (i.e., bactericidal capability) of the ultraviolet is maximized at near ultraviolet wavelength of 254 nm, which corresponds to the area of UV-C. Furthermore, the afore-mentioned bactericidal capability of the ultraviolet can be used for a wide variety of applications including, for example, a bactericidal light source for a hospital, a food processing system, or water supply and sewerage systems, and a light source for a degradative treatment of environmental pollutant by use of light catalyst.

While a bactericidal device employing a low pressure mercury lamp (peak wavelength: 254 nm) has been usually used as a near ultraviolet light source for emitting near ultraviolet ray, the use of mercury has been strictly regulated under RoHS Regulations and the like due to its adverse effect on environment or a human body in the case of leakage.

For the above reasons, ultraviolet light-emitting material employing hexagonal boron nitride (hBN) as described in, for example, JP 2007-9095 A has been investigated and developed as a new light-emitting source. Such new light-emitting source has been considered to be a substitute for mercury used with a low pressure mercury lamp.

In the followings, the low pressure lamp and CL (cathode luminescence)-type ultraviolet light source employing hBN as described in JP 2007-9095 A as a light-emitting source were compared with respect to the wavelength of output spectrum, bactericidal performance, and operating life.

A. Wavelength of Output Spectrum

FIG. 7A is a graph showing the comparison between the low pressure mercury lamp and the afore-mentioned hBN ultraviolet light source with respect to ultraviolet light spectrum and wavelength-dependency of bacteriocidal effect.

As shown in FIG. 7A, the output spectrum peak wavelength of the low pressure mercury lamp is 254 nm, which corresponds to the output spectrum of the sterilization ray, and the output spectrum peak wavelength of hBN ultraviolet light source is 223 mm, which is shifted to a short wavelength as much as approximately 30 nm in comparison to the low pressure mercury lamp. Furthermore, when comparing each ultraviolet spectrum peak wavelength of the above two light sources with the relative bacteriocidal effect value as defined by JIS-Z-8811, hBN ultraviolet light source has only very limited wavelength adapted for bacteriocidal use (i.e., sterilization), thereby being hardly capable of obtaining such bacteriocidal effect as can be obtained by the low pressure mercury lamp.

B. Bacteriocidal Performance Comparison

FIG. 7(B) shows a comparison between the low pressure mercury lamp and hBN ultraviolet light source with respect to luminescence intensity and bacteriocidal capability.

As shown in FIG. 7(B), the low pressure mercury lamp has a luminescence intensity of $10.0\,\mathrm{mW/cm^2}$, and hBN ultraviolet light source has a luminescence intensity of $0.9\,\mathrm{mW/cm^2}$. In view of the above, the luminescence intensity of hBN ultraviolet light source is only one tenth of that of the low pressure mercury lamp.

Bacteriocidal efficiency and bacteriocidal capability for the low pressure mercury lamp and hBN ultraviolet light source were respectively calculated in following steps:

Step 1: calculate a normalized spectrum $f(\lambda)$ such that the overall integral value of the luminescence spectrum is 1 (i.e., $\int f(\lambda)d\lambda=1$);

Step 2: Determine bacteriocidal efficiency as $\int X(\lambda)f(\lambda)d\lambda$ given that relative bacteriocidal effect value is $X(\lambda)$.

Step 3: Determine bacteriocidal capability by multiplying the luminescence intensity by the determined bacteriocidal efficiency.

By comparing the bacteriocidal efficiencies and bacteriocidal capabilities as determined in accordance with the above steps between the above two light sources, it has been confirmed that the low pressure mercury lamp is superior to hBN ultraviolet light source in terms of bacteriocidal efficiency and bacteriocidal capability.

As mentioned previously, in case of using hBN ultraviolet light source, any material such as mercury which can adversely affect human bodies is not used, thereby realizing environmentally-friendly bacteriocidal method, as well as, due to surface emitting making the area of light-emitting face larger. However, hBN ultraviolet light source is inferior to the low pressure mercury lamp in terms of luminescence intensity, ultraviolet spectrum peak wavelength, and operating life.

The inventors have continuously investigated a substitute for the above two ultraviolet light-emitting material, which can overcome the drawbacks of the above two types of ultraviolet light-emitting material while maintaining the advantages of the above two types of ultraviolet light-emitting material. Surprisingly, the inventors have found a new ultraviolet light-emitting material, which has luminescence intensity and a wavelength near the peak wavelength of the low pressure mercury lamp and in which due to surface emitting as performed by hBN ultraviolet light source luminescence efficiency can be enhanced, and a new ultraviolet light source employing the same ultraviolet light-emitting material.

SUMMARY OF THE INVENTION

As one objective, the invention provides a new ultraviolet light-emitting material and ultraviolet light source in which both bacteriocidal performance and luminescence efficiency are enhanced without any risk of adversely affecting human bodies.

In order to attain the objective, in one aspect, the invention provides an ultraviolet light-emitting material, which has a composition as represented by Formula (A). A dopant, Sc is added to a matrix, $Al_2O_3$.

$$(Al_{1-x}Sc_x)_2O_3 \tag{A}$$

Where x satisfies $0<x<1$.

Preferably, x is from 0.00078 to 0.040.

Preferably, the ultraviolet light-emitting material can be obtained by mixing $Al(OH)_3$ powder with $ScCl_3$ powder as a dopant, and subsequently calcining a mixture of $Al(OH)_3$ powder and $ScCl_3$ powder to create powdery ultraviolet light-emitting material.

In other aspect, the invention provides an ultraviolet light source, which includes an anode having a luminescent layer in which the ultraviolet light-emitting material as mentioned above is formed in a desired luminescent pattern, a cathode configured to release an electron, an acceleration control electrode disposed between the cathode and the anode, and configured to draw the electron from the cathode and to acceleration control the electron. The anode, the cathode, and the acceleration control electrode are received in a vacuum-sealed container. High voltage is applied to the anode such that the electron which has been released from the cathode and has been subjected to acceleration control, collides against the luminescent layer, thereby rendering the luminescent layer luminous.

The inventive ultraviolet light-emitting material does not contain mercury as conventionally used in the low pressure mercury lamp, bacteriocidal performance as well as luminescence efficiency are enhanced without any risk of adversely affecting human bodies, in comparison to hBN ultraviolet light-emitting material.

When synthesizing the ultraviolet light-emitting material, $Al(OH)_3$ powder is mixed with $ScCl_3$ powder, and a mixture as thus obtained is then calcined. As such, the ultraviolet light-emitting material in the form of powder having stabilized luminescence performance and being suited for the ultraviolet light source can be obtained.

Furthermore, as the inventive ultraviolet light source employs mercury-free ultraviolet light-emitting material having enhanced luminescence efficiency due to surface emitting, it can be applied to a wide variety of applications, including a semiconductor (i.e., highly refined photolithography), data or information (i.e., next-generation optical disc with a large data capacity), a medicine, a organism applications (i.e., ophthalmic treatment, DNA diagnosis, surface modification, sterilization, and etc.). The invention can be particularly useful in a TA (Thermal Autochrome)-type printer, an UV resin-curing device, a sterilizing device, an ozone washing device, a surface modifying device, a deodorizing device, a fluorescence analysis device, a banknote counter, a survey and identification device, an insect collector, and so on.

The foregoing and other aspects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims and herein for interpreting the scope of the invention.

BRIEF DESCRIPTION OF THE DRAWINGS

FIG. 6 is a table in which luminescence intensity, output spectrum peak wavelength, bacteriocidal efficiency, bacteriocidal capability, and relative bacteriocidal capacibility value are compared between the exemplary $(Al_{1-x}Sc_x)_2O_3$ and hBN ultraviolet light source as a control (i.e., comparative example).

DETAILED DESCRIPTION OF THE INVENTION

Ultraviolet light source employing the inventive ultraviolet light-emitting material will be described hereinafter. In one embodiment, the ultraviolet light source is a planer light source, which makes ultraviolet light-emitting material emit light at high voltage such as several kV or above. The invention can attain much more stabilized luminescence, downsizing, and enhanced homogenization of luminescence.

[Configuration of Ultraviolet Light Source]

Figure 1:
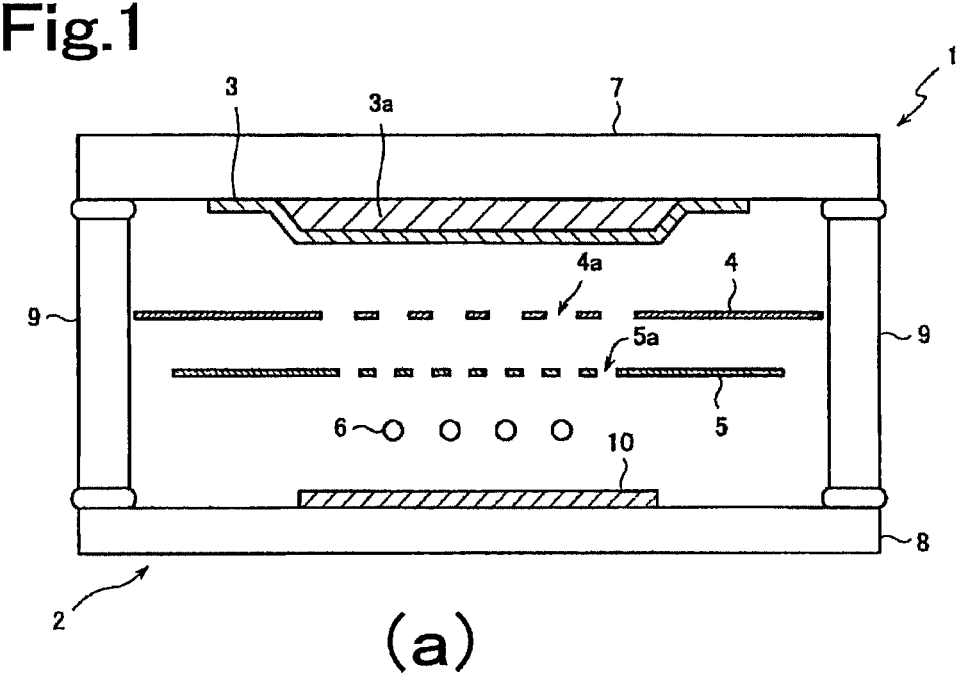
FIG. 1 is a schematic cross-sectional view of an ultraviolet light source employing one embodiment of an ultraviolet light-emitting material in accordance with the invention.
Figure 1:
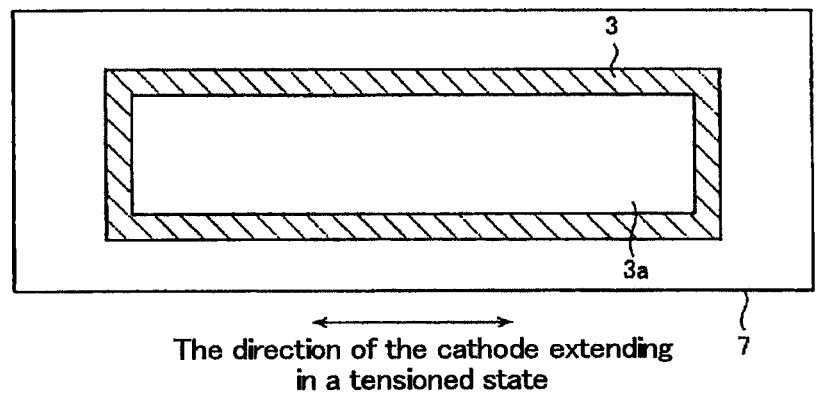

Referring FIG. 1, an ultraviolet light source 1 is shown to include a box-shaped container or outer shell 2, an anode 3, a shield electrode 4 (i.e., a second grid), an acceleration control electrode 5 (i.e., a first grid), and a cathode 6. The anode 3, the shield electrode 4, the accelerating control electrode 5, and the cathode 6 are spaced apart from each other, and are hermetically sealed as a vacuum inside the outer container 2.

The container 2 (i.e., outer shell) includes a first rectangular substrate 7 (i.e., an anode substrate) formed of a translucent silica glass or YAG (Yttrium Aluminum Garnet) and a second rectangular substrate 8 (i.e., a back substrate) formed of soda-lime glass, which is spaced apart from the first rectangular substrate 7, and is opposed to the first rectangular substrate 7. A side plate 9 formed of an insulating material such as soda-lime glass is mounted to the outer peripheries of the two substrates 7, 8. The side plate 9, and the two substrates are hermetically sealed by fritted glass. As such, the container 2 is assembled. The inside of the container 2 is vacuum-exhausted by an exhaust duct (not shown) and the aforementioned electrodes (i.e., the anode 3, the shield electrode 4, the acceleration control electrode 5, and the cathode 6) inside the container 2 are held under high vacuum.

In accordance with an embodiment as shown in FIG. 1, a luminescent layer 3a having a desired shape for example rectangular shape is attached to an opening of a frame-shaped conductor portion formed of for example aluminum film. As such, the anode 3 can be formed. High voltage at several kV or above is continuously applied via a lead terminal (not shown) to the anode 3. An electron released from the cathode 6 collides against the surface of the luminescent layer 3a, thereby allowing the luminescent layer 3a to emit light.

The shield electrode 4 is formed of conductive metal such as 426 alloy, and is disposed above and apart from the acceleration control electrode 5 inside the container 2. The shield electrode 4 has mesh or slit-shaped openings 4a, which are finer than those of the acceleration control electrode 5, in the surface opposed to the acceleration control electrode 5. Due to a lead terminal (not shown) the shield electrode 4 can hermetically pass through the container 2, in particular, sealed portion, and is leaded outside. High voltage for example 20-30V is continuously applied to the shield electrode 4. Higher voltage is applied to the shield electrode 4 in comparison to the acceleration control electrode 5.

The acceleration control electrode 5 may be formed of conductive metal such as 426 alloy. The acceleration control electrode 5 is disposed between the anode 3 and the cathode 6 inside the container 2 with being spaced apart from the anode 3 and the cathode 6 respectively. The acceleration control electrode 5 has a fine mesh or slit-shaped opening 5a in the surface thereof. The opening 5a is formed in the surface of the acceleration control electrode 5 such that the area surface of the acceleration control electrode 5 is less than that of the luminescent pattern (i.e., light-emitting pattern) of the luminescent layer 3a. Due to this configuration, invalid current which does not flow to the light-emitting portion can be decreased. Furthermore, due to a lead terminal (not shown) the acceleration control electrode 5 can hermetically pass through the container 2, in particular sealed portion, and is leaded outside.

The cathode 6 is in a tensioned state along a longitudinal direction of the anode 3 between the acceleration control electrode 5 and the back substrate 8 in the container 2. In the shown embodiment, the cathode 6 is a filamentary linear cathode configured to emit or release an electron(s) by heating, and can be usually called as "directly-heated cathode". Moreover, the cathode 6 can hermetically pass through the container 2, in particular sealed portion, and is leaded outside.

When the ultraviolet light source 1 and an object to be irradiated are subjected to relative displacement, the cathode 6 extending in a tensioned state along a short direction causes a periodic uneven brightness in a longitudinal direction (i.e., a main direction) to occur. For the reason, the cathode 6 is preferably subjected to tension along a longitudinal direction, thereby allowing for even or regular light-emitting in the longitudinal direction (i.e., the main direction). An electron source such as a field emission or a carbon nanotube in addition to the afore-mentioned linear directly-heated cathode can be also used as the cathode 6.

Moreover, a back electrode 10 is disposed adjacent the back substrate 8 in the container 2, and is formed of conductive metal such as 426 alloy. In detail, the back substrate 8 is opposed to the acceleration control electrode 5 with the cathode 6 intervening between the back substrate 8 and the acceleration control electrode 5. In one embodiment, the back electrode 10 is disposed below the cathode 6 and over the back substrate 8.

The back electrode 10 is made in common with the acceleration control electrode 5 in terms of constitution, in particular material, and has a distance from the cathode 6 equal to or greater than a distance between the acceleration control electrode 5 and the cathode 6. In other words, the back electrode 10 is disposed such that the ratio of the distance between the cathode 6 and the back electrode 10 and the distance between the cathode 6 and the acceleration control electrode 5 is equal to or greater than 1. The back electrode 10 has a positive potential, thereby spreading the electron flow from the cathode 6.

While the back electrode 10 is made in common with the acceleration control electrode 5 in terms of constitution, in particular material for the purpose of easier manufacture, it may be manufactured separately from the acceleration control electrode 5. In this case, the back electrode 10 and the acceleration control electrode 5 can be controlled respectively. Due to this configuration more desirable electron flow in a shield state can be created. Alternatively, the back electrode 10 may be omitted.

[Ultraviolet Light-Emitting Material]

Next, ultraviolet light-emitting material which would form the luminescent layer 3a will be hereinafter described in detail. In one embodiment, the ultraviolet light-emitting material can be formed of a matrix material of $Al_2O_3$ and a dopant of Sc, which is added to the matrix material. The composition of the ultraviolet light-emitting material, Sc-doped $Al_2O_3$ can be represented by the following (A):

$$(Al_{1-x}Sc_x)_2O_3 \qquad (A)$$

In above composition (A), x satisfies 0<x<1, and is preferably within a range from 0.00078 to 0.040.

In the process for producing the ultraviolet light-emitting material in accordance with one embodiment of the invention, one of the raw material, $Al(OH)_3$, when being subjected to calcination, is heated to generate $Al_2O_3$. A part of Al of $Al_2O_3$ is substituted with Sc, which can be called as solid-phase reaction. As a result, a product (i.e., corundum) as represented by Formula (A) is produced. Molar number of the product can be converted from the weight thereof.

In the process for producing the ultraviolet light-emitting material of one embodiment of the invention, it may be desirable to use powdery material rather than monocrystal material in terms of mechanical processabilities suited for the manufacture of a device. Furthermore, in a case where the monocrystal material is ground to powdery material, a desired light-emitting efficiency may not be obtained. This is because the crystal breaks.

For the above reasons, the ultraviolet light-emitting material in accordance with one embodiment of the invention can be synthesized using both powdery raw materials $Al(OH)_3$ and $ScCl_3$. As such, the ultraviolet light-emitting material particulate having a diameter of about 1 micrometer to about 10 micrometers can be synthesized.

Figure 2:
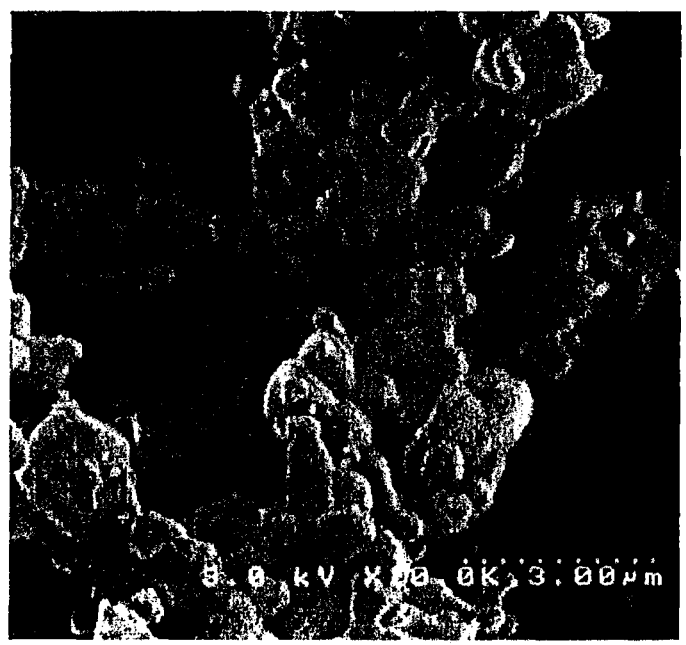
FIG. 2 is a SEM photograph of an ultraviolet light-emitting material as synthesized.

FIG. 2 is a SEM photograph of ultraviolet light-emitting material as thus synthesized. As shown in FIG. 2, the ultraviolet light-emitting material as thus synthesized does not have an angulated, distorted shape as obtained by grinding a single crystal, but has a shape of surface-smoothed particulate.

Furthermore, as percent scandium, which is added as the dopant, is increased, the scandium elements at increased level in the ultraviolet light-emitting material having a composition as represented by Formula (A) may interacts with each other. In other words, concentration quenching may occur. For the above reasons, x is greater than 0 and less than 1, and x is preferably within a range from 0.00078 to 0.040.

EXAMPLES

Preparation of ultraviolet light-emitting material and preparation of ultraviolet light source will be hereinafter described with examples. However, the preparation of ultraviolet light-emitting material and preparation of ultraviolet light source are not limited to the examples.

[Preparation of Ultraviolet Light-Emitting Material]

Raw materials for ultraviolet light-emitting material were as follows:

$Al(OH)_3$ powder: 1.54 g $ScCl_3$ powder: 29.8 mg

The raw materials were mixed and a mixture as thus obtained was moved to an alumina crucible. The crucible was then disposed in an electric furnace. The mixture was calcined at 150 Celsius Degrees for two hours to create a composite (i.e. a compound). The calcination may be performed in the atmosphere. Next, the composite which has been cooled to room temperature was moved to a mortar. The composite was atomized to a powder having a size suited to be printed on the anode 3 disposed above the anode substrate 7.

Figure 3:
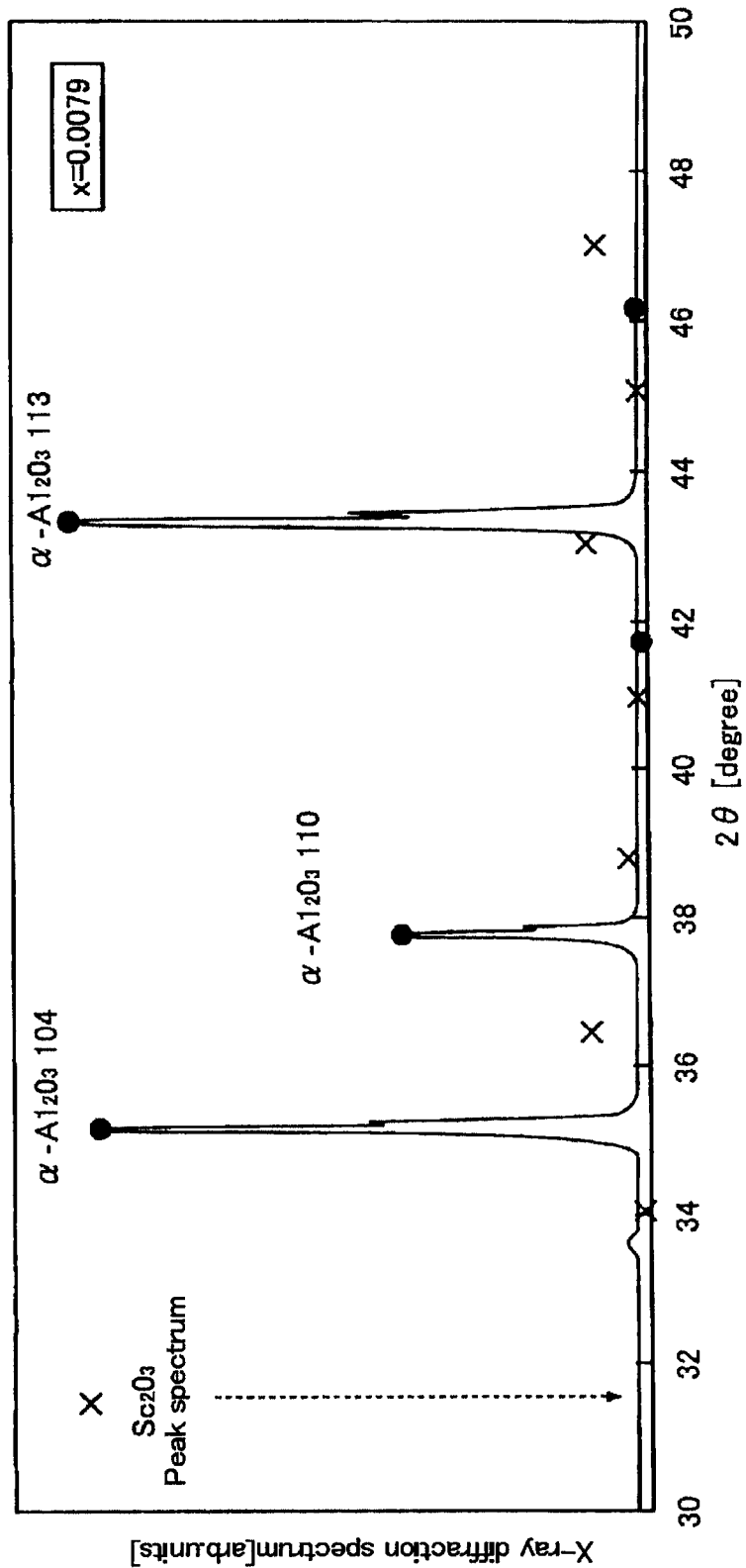
FIG. 3 shows X-ray diffraction spectrum (XRD) performed on a powdery compound as synthesized.

FIG. 3 shows X-ray diffraction performed on the powdery composite as synthesized. A mixture in which $Al_2O_3$ powder was merely mixed with 0.5% $Sc_2O_3$ powder had a peak spectrum of $Sc_2O_3$ at 31.5 Celsius Degrees. To the contrary, the composite as synthesized previously in which x in $(Al_{1-x}Sc_x)_2O_3$ was even 0.0079 did not have the peak spectrum of $Sc_2O_3$, and only the spectrum of corundum $Al_2O_3$ was detected. In view of the above, there was no $Sc_2O_3$ crystal in the powdery composite, and the powdery composite was identified to be a crystal phase consisting of only corundum $Al_2O_3$.

The XRD analysis has demonstrated that the powdery composite as synthesized has Sc element therein.

As a result, it has been found that $Al_2O_3$ corundum crystal as synthesized contains Sc element, the powdery composite does not contain $Sc_2O_3$ hexagonal crystal at all. In other words, the powdery composite as synthesized has been found to be a compound having a corundum structure as represented by the above composition (A).

[Preparation of Ultraviolet Light Source]

Firstly, the powdery composite as an ultraviolet light-emitting material, and a conventional organic solvent and binder used for preparation of vacuum fluorescent display (VFD) were mixed to create phosphor paste to be used for an ultraviolet light source. Subsequently, the phosphor paste was used to create a desired luminescent pattern (i.e., a light-emitting pattern) on the anode substrate by screen printing. The desired luminescent pattern was calcined to decompose and evaporate the organic solvent and binder to have been contained in the phosphor paste.

Subsequently, the shield electrode 4, the acceleration control electrode 5, and the cathode 6 were disposed apart from each other between the anode substrate 7 having the anode 3 formed therein and the back substrate 8 having the back electrode 10 formed therein. The cathode 3 was formed by printing the phosphor paste in the form of the desired luminescent pattern. The anode substrate 7 and the back substrate 8 were hermetically sealed to create an ultraviolet light source suited for surface emitting.

[Performance Test]

Next, the performances of the ultraviolet light source were investigated. As a comparative example (i.e., a control), hexagonal boron nitride (hBN) single crystal powder as described in JP 2007-9095 A was used for the ultraviolet light-emitting material. Furthermore, the comparative example of the ultraviolet light-emitting material was prepared in the same manner as the above example was prepared.

Each of the light sources was measured by driving the anode at 5 kV-0.15 mA. The light-emitting surface area was set to 1 $cm^2$ and the distance for measurement was 10 mm. Bacteriocidal efficiency and bacteriocidal capability were calculated using JIS-X-8811 (Steps 1-3) as mentioned in the column of "2. Background of the Invention".

[Luminescence Intensity for Sc Ratio]

Figure 4:
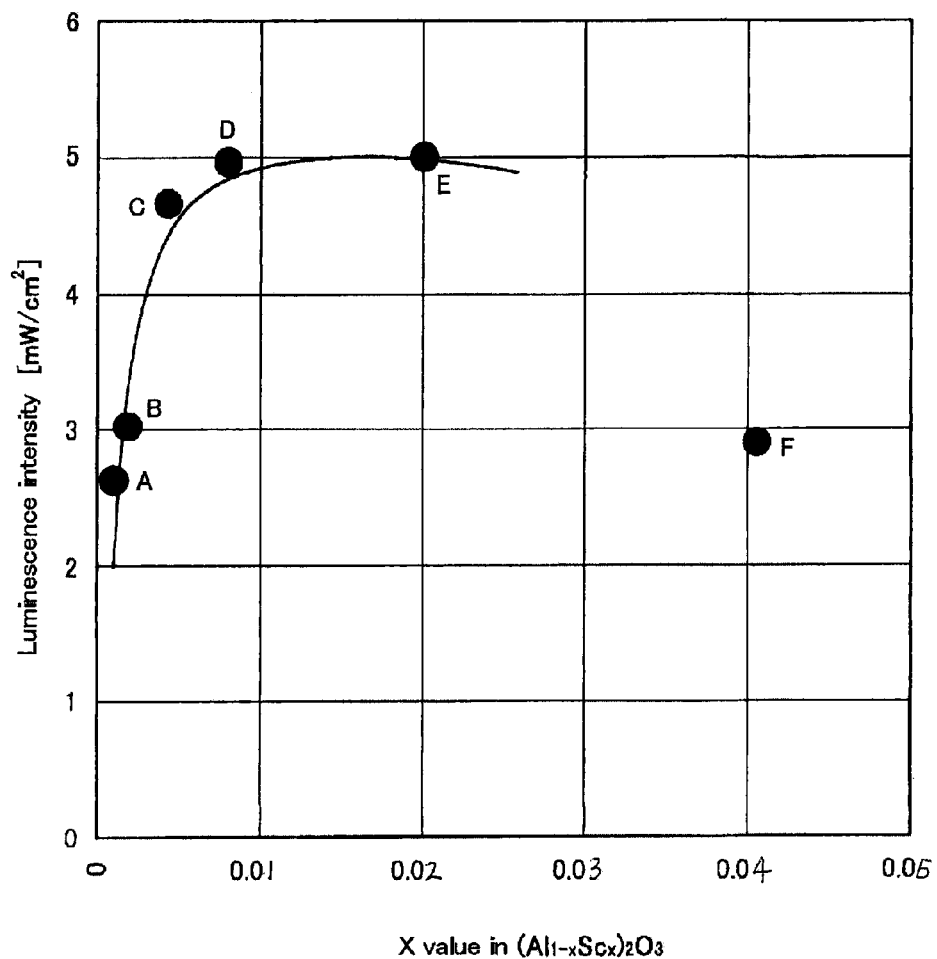
FIG. 4 graphically shows the relationship between x value in an exemplary ultraviolet light-emitting material, $(Al_{1-x}Sc_x)_2O_3$ and luminescence intensity.

FIG. 4 graphically shows the relationship between x value in an exemplary ultraviolet light-emitting material, $(Al_{1-x}Sc_x)_2O_3$ and luminescence intensity. In this experimentation, the range of x in $(Al_{1-x}Sc_x)_2O_3$ was from 0.00078 to 0.040. The irradiance at each point was as follows:

Luminescence intensity at Point A (x=0.00078): 2.64 mW/$cm^2$
Luminescence intensity at Point B (x=0.0016): 3.03 mW/$cm^2$
Luminescence intensity at Point C (x=0.0041): 4.68 mW/$cm^2$
Luminescence intensity at Point D (x=0.0079): 4.98 mW/$cm^2$
Luminescence intensity at Point E (x=0.020): 5.02 mW/$cm^2$
Luminescence intensity at Point F (x=0.040): 2.91 mW/$cm^2$ Luminescence intensity of hBN ultraviolet light source, as measured under the same condition, was 0.38 mW/$cm^2$. In view of the above, $(Al_{1-x}Sc_x)_2O_3$ ultraviolet light source of the embodiment had luminescence intensity from ten to fifteen times greater than hBN ultraviolet light source.

[Comparison of Peak Wavelength and Luminescence Intensity of Output Spectrum]

Figure 5:
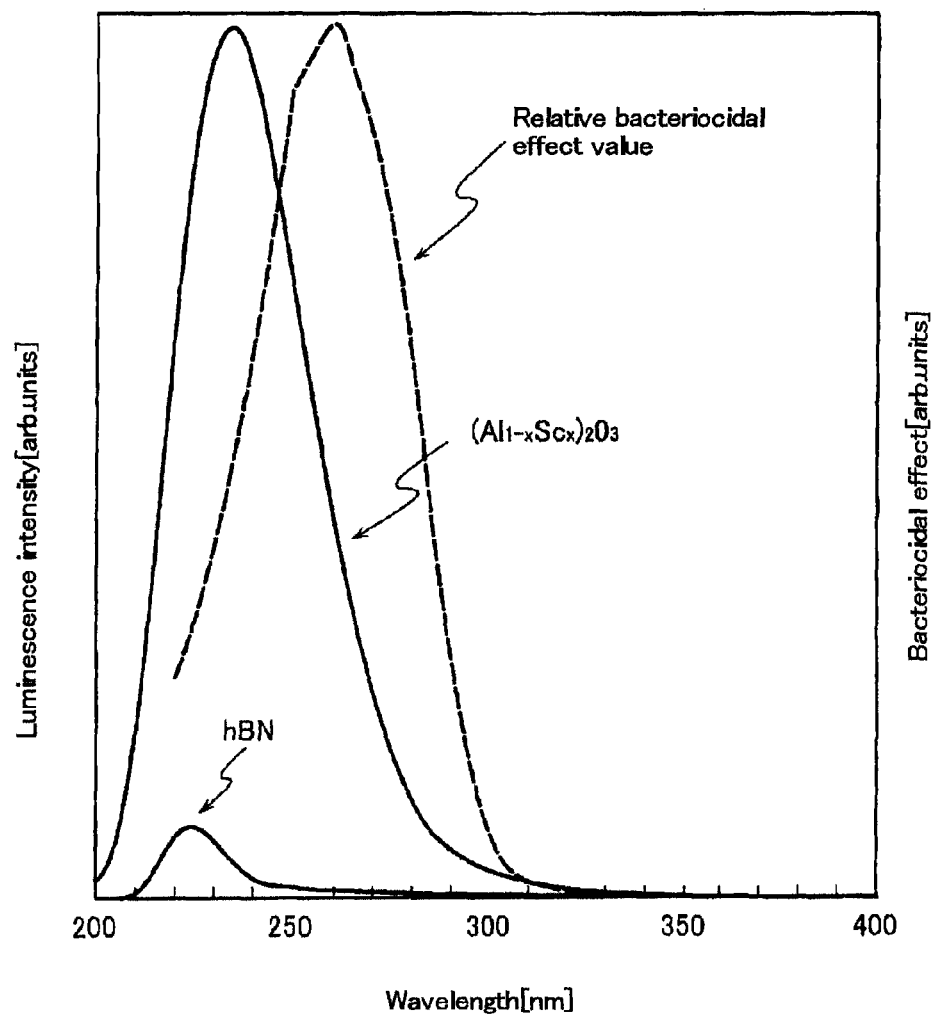
FIG. 5 graphically shows the relationship between output spectrum of an exemplary $(Al_{1-x}Sc_x)_2O_3$ ultraviolet light source and both luminescence intensity and wavelength-dependency of bacteriocidal effect.
Figures 7A, 7B:
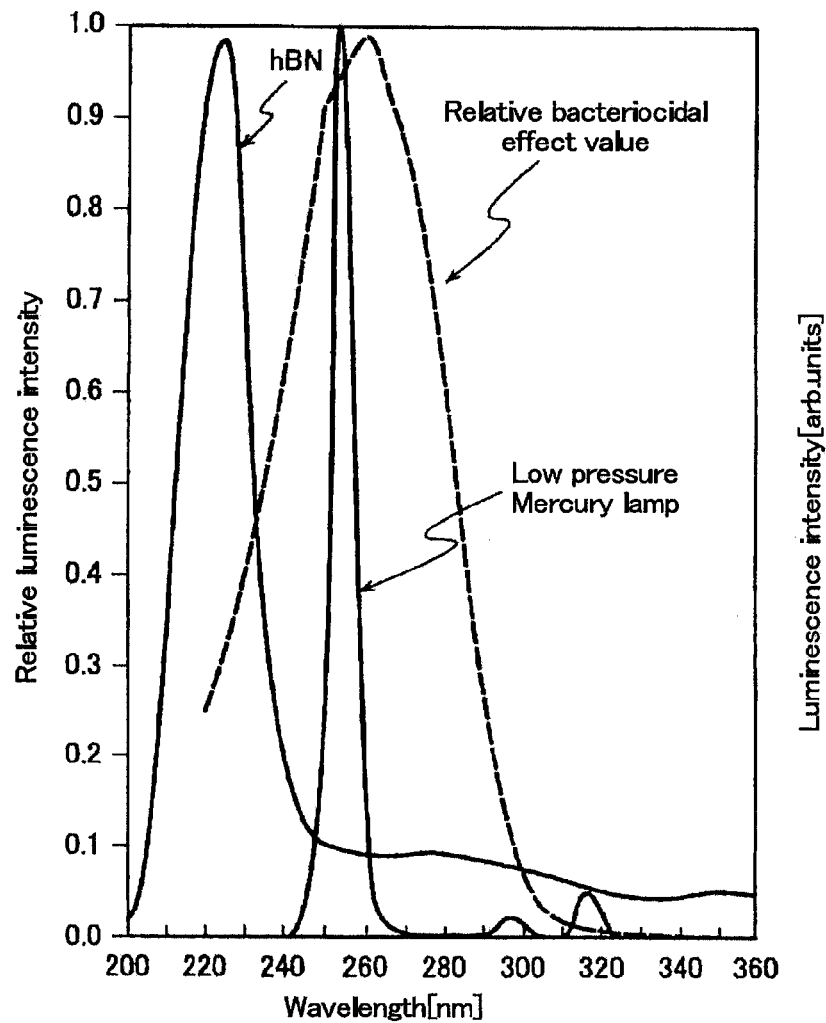
FIG. 7A is a graph showing the comparison between a low pressure mercury lamp and hBN ultraviolet light source as disclosed in JP 2007-9095 A with respect to ultraviolet light spectrum and wavelength-dependency of bacteriocidal effect.
FIG. 7(B) shows a comparison between the low pressure mercury lamp and the hBN ultraviolet light source with respect to luminescence intensity and bacteriocidal capability.

FIG. 5 graphically shows the relationship between output spectrum of an exemplary $(Al_{1-x}Sc_x)_2O_3$ ultraviolet light source and both luminescence intensity and wavelength-dependency of bacteriocidal effect. Also, FIG. 6 is a table in which luminescence intensity, output spectrum peak wavelength, bacteriocidal efficiency, bacteriocidal capability, and relative bacteriocidal capability value are compared between the exemplary $(Al_{1-x}Scx)_2O_3$ and hBN ultraviolet light source as the comparative example (i.e., the control).

As shown in FIGS. 5 and 6, the hBN ultraviolet light source as the comparative example had the output spectrum peak wavelength of 221 nm and the luminescence intensity of 0.38 mW/$cm^2$. To the contrary, the exemplary $(Al_{1-x}Sc_x)_2O_3$ ultraviolet light source had the output spectrum peak wavelength of 233 nm and the luminescence intensity of 5.7 mW/$cm^2$. In view of the above, it is demonstrated that the peak wavelength of the exemplary $(Al_{1-x}Sc_x)_2O_3$ ultraviolet light source is closer than the peak wavelength of hBN ultraviolet light source to sterilization ray (i.e., 254 nm).

[Comparison of Bacteriocidal Efficiency, Bacteriocidal Capability, and Relative Bacteriocidal Capability Value]

As shown in FIG. 6, hBN ultraviolet light source as the control had bacteriocidal efficiency of 0.36 and bacteriocidal capability of 0.14, and the exemplary $(Al_{1-x}Sc_x)_2O_3$ ultraviolet light source had bacteriocidal efficiency of 0.54 and bacteriocidal capability of 3.1. As the bacteriocidal capability is increased by the number of "1", the number of bacterial death is doubled under the same condition. In other word, the period of time for sterilization is decreased by half. Furthermore, when hBN ultraviolet light source was considered "1", the relative bacteriocidal capability value of the exemplary $(Al_{1-x}Sc_x)_2O_3$ ultraviolet light source was identified to be "23". In view of the above, the exemplary $(Al_{1-x}Sc_x)_2O_3$ ultraviolet light source was found to have remarkably advantageous bacteriodical efficiency and bacteriocidal capability in comparison to hBN ultraviolet light source.

It is demonstrated that the exemplary $(Al_{1-x}Sc_x)_2O_3$ ultraviolet light source has peak wavelength and luminescence intensity comparable to those of the low pressure mercury lamp, and has bacteriocidal efficiency and bacteriocidal capability superior to those of hBN ultraviolet light source.

The present invention has been described in terms of one or more preferred embodiments, and it should be appreciated that many equivalents, alternatives, variations, and modifications, aside from those expressly stated, are possible and within the scope of the invention.

The invention claimed is:

1. An ultraviolet light-emitting material having a composition as represented by Formula (A):

$$(Al_{1-x}Sc_x)_2O_3 \qquad (A)$$ 

wherein a dopant, Sc is added to a matrix, $Al_2O_3$, and wherein x is from 0.00078 to 0.040.

2. The ultraviolet light-emitting material according to claim 1, wherein the ultraviolet light-emitting material is obtained by mixing $Al(OH)_3$ powder with $ScCl_3$ powder as a dopant, and subsequently calcining a mixture of Al(OH)$_3$ powder and ScCl$_3$ powder to create powdery ultraviolet light-emitting material.

3. An ultraviolet light source, comprising:

an anode having a luminescent layer in which ultraviolet light-emitting material is formed in a desired luminescent pattern, the ultraviolet light-emitting material having a composition as represented by Formula (A):

$$(Al_{1-x}Sc_x)_2O_3 \qquad (A)$$

wherein a dopant, Sc is added to a matrix, Al$_2$O$_3$, and wherein x is from 0.00078 to 0.040;

a cathode configured to release an electron; and an acceleration control electrode disposed between the cathode and the anode, and configured to draw the electron from the cathode and to acceleration control the electron, wherein the anode, the cathode, and the acceleration control electrode are received in a vacuum-sealed container, and wherein the ultraviolet light source is configured to apply high voltage to the anode such that the electron, which has been released by the cathode and has been subjected to accelerated control, collides against the luminescent layer, thereby rendering the luminescent layer luminous.

4. The ultraviolet light source according to claim 3, in which the ultraviolet light-emitting material is obtained by mixing Al(OH)$_3$ powder with ScCl$_3$ powder as a dopant, and subsequently calcining a mixture of Al(OH)$_3$ powder and ScCl$_3$ powder to create powdery ultraviolet light-emitting material.

* * * * *